United States Patent
Ma et al.

(10) Patent No.: US 9,705,646 B2
(45) Date of Patent: Jul. 11, 2017

(54) MULTI-INPUT MULTI-OUTPUT (MIMO) DETECTION SYSTEMS

(71) Applicant: Georgia Tech Research Corporation, Atlanta, GA (US)

(72) Inventors: Xiaoli Ma, Norcross, GA (US); Qingsong Wen, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 15/056,986

(22) Filed: Feb. 29, 2016

(65) Prior Publication Data

US 2016/0254883 A1 Sep. 1, 2016

Related U.S. Application Data

(60) Provisional application No. 62/121,809, filed on Feb. 27, 2015.

(51) Int. Cl.
*H04L 1/20* (2006.01)
*H04B 7/0413* (2017.01)

(52) U.S. Cl.
CPC ............ *H04L 1/203* (2013.01); *H04B 7/0413* (2013.01)

(58) Field of Classification Search
CPC ............... H04L 1/203; H04L 25/03891; H04L 25/0248; H04L 2025/03426; H04L 2025/03643; H04L 25/0204; H04L 25/03229; H04L 25/03235; H04B 7/0413; H04B 7/0417; H04B 7/0663; H04B 7/0854

See application file for complete search history.

(56) References Cited

U.S. PATENT DOCUMENTS

2009/0003476 A1\* 1/2009 Rog .................... H04L 25/0204
   375/260
2009/0196360 A1\* 8/2009 Gan .................... H04L 25/0204
   375/260

(Continued)

OTHER PUBLICATIONS

"A Low Complexity Fast Lattice Reduction Algorithm for MIMO Detection", by Kanglian Zhao, Yang Li, Hua Jiang, Sidan Du. 2012 IEEE 23rd international symposium on personal, indoor and Mobile radio communications—(PIMRC).\*

*Primary Examiner* — Syed Haider
(74) *Attorney, Agent, or Firm* — Troutman Sanders LLP; Ryan A. Schneider; Christopher C. Close, Jr.

(57) ABSTRACT

Embodiments of the present invention provide efficient greedy LLL algorithms that not only converge faster but also exhibit much lower complexity than the existing greedy LLL variants while similar error performance is maintained. First, a relaxed Lovász condition is designed for searching the candidate set of LLL iterations with column swap operations. This relaxation does not need size reduction operations so that it can save complexity compared to the existing greedy LLL algorithms. Further, a relaxed criterion of the decrease in LLL potential is designed to select the optimal one in the candidate set of LLL iterations, which also exhibits lower complexity than the existing greedy LLL algorithms. Furthermore, simulations show that the inventive algorithm needs less LLL iterations compared to the existing greedy LLL algorithms.

18 Claims, 6 Drawing Sheets

(56) References Cited

U.S. PATENT DOCUMENTS

| | | | |
|---|---|---|---|
| 2010/0239043 A1* | 9/2010 | Li | H04L 25/03242 375/267 |
| 2014/0254727 A1* | 9/2014 | Kim | H04B 7/0417 375/340 |

* cited by examiner

Fig. 1. BER performance comparisons of the different LR algorithms in dual-LR-aided MMSE and LR-aided MMSE-SIC detectors for 4 × 4 MIMO systems with 64-QAM.

Convergence comparisons of different LR algorithms in a 4 × 4 MIMO system.

(a) Different LRs used for dual-LR-aided MMSE detectors.

(b) Different LRs used for LR-aided MMSE-SIC detectors.

Complexity comparisons of different LR algorithms from 3 × 3 to 8 × 8 MIMO systems.

BER versus maximum number of LLL iterations of different LRs with early termination in a 4 × 4 MIMO system with 64-QAM.

(a) Different LRs used for dual-LR-aided MMSE detectors with Eb/No=26.5dB.

(b) Different LRs used for LR-aided MMSE-SIC detectors with Eb/No=25.5dB.

Complexity versus maximum number of LLL iterations of different LRs with early termination in a 4 × 4 MIMO system with 64-QAM.

MULTI-INPUT MULTI-OUTPUT (MIMO) DETECTION SYSTEMS

CROSS-REFERENCE TO RELATED APPLICATIONS

This application claims the benefit of U.S. Provisional Application No. 62/121,809 filed 27 Feb. 2015 the entire contents and substance of which is hereby incorporated by reference.

BACKGROUND OF THE INVENTION

1. Field of the Invention

The present invention generally relates to the following system model $$y = Hs + w, \quad (1)$$

where y is an $N_r \times 1$ complex received signal vector, H is an $N_r \times N_t$ complex channel matrix, s is an $N_t \times 1$ complex transmitted signal vector drawn from the QAM constellation set, whose real and imaginary parts are $\{-\sqrt{\mathcal{M}}+1, \ldots, -1, 1, \ldots, \sqrt{\mathcal{M}}-1\}$ with $\mathcal{M}$ being the constellation size, and w is the additive white Gaussian noise vector with zero mean and covariance matrix as $\sigma_w^2 I_{N_r}$. In the most general case, the invention is an improved complex lattice reduction (LR) technique used in the LR-aided detectors to find the near-optimal solution to (1).

2. Description of Related Art

Multi-input multi-output (MIMO) systems have been adopted in recent wireless standards (e.g., IEEE 802.11n/ac, 3GPP LTE/LTE-A) because of the high spectral efficiency and large coverage. The system model (1) can be applied to multi-input multi-output (MIMO) system, generalized signal carrier frequency division multiple access (GSC-FDMA) system, and precoded FDMA (P-FDMA) system as special cases, with different realizations of the H matrix corresponding to different systems. To recover the signal vector s given the model (1), different detection methods can be adopted. The optimal detection is the maximum likelihood (ML) detector, but it exhibits exponential complexity. To alleviate the complexity of the ML detector, linear detectors (LDs), successive interference cancelation (SIC) detector, and K-best detector, have been proposed. However, these detectors degrade error performance due to diversity loss. To obtain high error performance with low complexity in the detection of problem (1), lattice reduction (LR) techniques have been added to the existing LDs, SIC, and K-best detectors to collect full receive diversity.

LLL/ELLL Algorithm

Among different LR schemes, LLL/ELLL algorithm is a commonly adopted technique in LR-aided detectors. The detailed complex LLL algorithm based on QR preprocessing (the preprocessing part can also be sorted QR decomposition (SQRD) or MISE-SQRD to reduce LLL's complexity) can be found in Table I. The LLL/ELLL iteratively performs three steps: 1) size reduction for LLL or effective size reduction for ELLL (lines 4-10); 2) Lovász condition evaluation (line 11); and 3) column swap (lines 12-15) if the Lovász condition is not satisfied. The $\frac{1}{2} < \delta \leq 1$ used in the LLL/ELLL is a quality parameter selected to control the performance-complexity tradeoff (larger $\delta$ leads to better performance with higher complexity). Note that during the execution of the LLL/ELLL algorithm, the column swap may not happen in some cases, which is not efficient in terms of convergence and complexity.

TABLE I

THE LLL/ELLL ALGORITHM

Input: Q, R, P (after QR/SQRD/MMSE-SQRD†)
Output: Q, R, T
1: Initialization: $Q = Q$, $R = R$, $T = P$, $\delta \in (1/2, 1]$
2: $k = 2$
3: while $k < N_t$ 4:    for $n = k - 1 : -1 : 1$ (LLL) or for $n = k - 1$ (ELLL) ⎫
5:       $u = \lceil \tilde{R}_{n,k} / \tilde{R}_{n,n} \rfloor$
6:       if $u \neq 0$                                   (effective) size
7:          $\tilde{R}_{1:n,k} = \tilde{R}_{1:n,k} - u\tilde{R}_{1:n,n}$   reduction
8:          $T_{:,k} = T_{:,k} - uT_{:,n}$
9:    end
10:   end ⎭

11:  if $\delta|R_{k-1,k-1}|^2 > |R_{k,k}|^2 + |R_{k-1,k}|^2$ }Lovász condition

12:    swap columns $k - 1$ and $k$ in $\tilde{R}$ and $\tilde{T}$ ⎫
13:    $\Theta = \begin{bmatrix} \alpha^* & \beta \\ -\beta & \alpha \end{bmatrix}$ with $\alpha = \frac{\tilde{R}_{k-1,k-1}}{\|\tilde{R}_{k-1:k,k-1}\|}$, $\beta = \frac{\tilde{R}_{k,k-1}}{\|\tilde{R}_{k-1:k,k-1}\|}$   column swap
14:    $\tilde{R}_{k-1:k,k-1:N_t} = \Theta \tilde{R}_{k-1:k,k-1:N_t}$
15:    $\tilde{Q}_{:,k-1:k} = \tilde{Q}_{:,k-1:k} \Theta^{\mathcal{H}}$ ⎭

16:    k = max(k-1, 2)
17:  else
18:    k = k + 1
19:  end
20: end

†QR: $H = QR$, $P = I$;
SQRD: $HP = QR$;
MMSE-SQRD: $\bar{H}P = [Q^T \bar{Q}^T]^T R$.
Q is an $N_r \times N_t$ matrix, R and P are $N_t \times N_t$ matrixes.

Existing Greedy LLL Algorithms

The existing greedy LLL algorithms, i.e., possible-swap LLL with optimal swap selection criterion (PSLLL-OSSC) and greedy diagonal reduction (GDR), add two major modifications to the original LLL algorithm before each LLL iteration: one is to find the candidate set of LLL iterations with column swap operations; the other is to select an LLL iteration in the candidate set such that the decrease of LLL potential is maximized each time. These modifications make the column swap always happen during the execution of the greedy LLL algorithms. Therefore, the existing greedy LLL algorithms converge faster and/or exhibit lower complexity than the original LLL/ELLL algorithm.

BRIEF SUMMARY OF THE INVENTION

It is thus an intention of the present invention to design efficient greedy LLL algorithms that not only converge faster but also exhibit much lower complexity than the existing greedy LLL variants while the error performance is maintained. First, a relaxed Lovász condition for searching the candidate set of LLL iterations with column swap operations is designed. This relaxation does not need size reduction operations so that it can save complexity compared to the existing greedy LLL algorithms. Further, a relaxed criterion of the decrease in LLL potential is designed to select the optimal one in the candidate set of LLL iterations, which also exhibits lower complexity than the existing greedy LLL algorithms. Furthermore, simulations show that the inventive algorithm needs less LLL iterations compared to the existing greedy LLL algorithms. Throughout the present application, we adopt the complex-valued versions for the LLL and different LLL variants.

In one embodiment, a method is provided comprising: receiving, at each one of a plurality of receiving sources, a plurality of transmit signal vectors, each of the plurality of transmit signal vectors originating from one of a plurality of transmitting sources; generating a channel matrix based on the received plurality of transmit signal vectors; decomposing the channel matrix to generate at least one alternate matrix; performing lattice reduction on the at least one alternate matrix to generate a transformed channel matrix comprising a reduced basis, the lattice reduction comprising: using a relaxed condition, searching a candidate set of LLL iterations with column swap operations in the at least one alternate matrix, wherein the relaxed condition provides for searching the candidate set of LLL iterations without performing size reduction operations on the at least one alternate matrix; using a relaxed criterion of decrease in LLL potential, selecting a first selection from the candidate set of LLL iterations; comparing the first selection to a predetermined termination condition; responsive to determining that the termination condition is not met, iteratively selecting a next selection from the candidate set of LLL iterations, each selection iteration comprising: performing a size reduction of the at least one alternate matrix to obtain at least one reduced matrix; performing a column swap on the at least one reduced matrix; using the relaxed condition, searching the at least one reduced matrix for a candidate set of LLL iterations with column swap operations; using the relaxed criterion of decrease in LLL potential, determining the next selection from the candidate set of LLL iterations; and comparing the next selection to the termination condition. The method also comprises, responsive to determining that the termination condition is met, generating the reduced basis transformed channel matrix from the at least one alternate matrix; providing the reduced basis transformed channel matrix to a detector; and based on the reduced basis transformed channel matrix, detecting particular transmit signal vectors for processing.

In some embodiments, the method further comprises wherein the transmitting sources comprise transmitting antennas in a multiple-input, multiple-output system and the receiving sources comprise receiving antennas in a multiple-input, multiple-output system.

In some embodiments, the method further comprises wherein the relaxed condition for searching the candidate set of iterations comprises $$\frac{|\tilde{R}_{k,k}|}{|\tilde{R}_{k-1,k-1}|} \geq \frac{1}{\sqrt{2}}, \quad \forall k \in [2, N_t].$$

In some embodiments, the method further comprises wherein the relaxed criterion of decrease in LLL potential comprises $$k = \mathrm{argmin}_{2 \leq k \leq N_t} \frac{|\tilde{R}_{k,k}|}{|\tilde{R}_{k-1,k-1}|}.$$

In some embodiments, the method further comprises wherein the predetermined termination condition comprises $n_k \geq 1/\sqrt{2}$. In some embodiments, the method further comprises wherein the predetermined termination condition further comprises an iteration count being less than a predefined maximum count.

In some embodiments, the method further comprises wherein the relaxed condition for searching the candidate set of iterations comprises $\sqrt{2}|\tilde{R}_{k,k}| \geq |\tilde{R}_{k-1,k-1}|$, $\forall k \in [2, N_t]$. In some embodiments, the method further comprises wherein the relaxed criterion of decrease in LLL potential comprises $$k = \begin{cases} \mathrm{argmin}_{flag(k)==1, 2 \leq k \leq N_t(k)} & \text{if Dual-}LR\text{-aided }LD \\ \mathrm{argmin}_{flag(k)==1, 2 \leq k \leq N_t(k)} & \text{if }LR\text{-aided }SIC/K\text{-best} \end{cases}$$

In some embodiments, the method further comprises wherein the predetermined termination condition comprises $\mathrm{flag}(k) = (\sqrt{2}|\tilde{R}_{k,k}| < |\tilde{R}_{k-1,k-1}|)$. In some embodiments, the method further comprises wherein the predetermined termination condition further comprises an iteration count being less than a predefined maximum count.

In another embodiment, a transmission system is provided comprising: a plurality of transmitting antennas; a plurality of receiving antennas; and an apparatus comprising: at least one processor; and at least one memory comprising computer program instructions, the computer program instructions when executed by the at least one processor, causing the apparatus to: receive, at each one of the plurality of receiving antennas, a plurality of transmit signal vectors, each of the plurality of transmit signal vectors originating from one of the plurality of transmitting antennas; generate a channel matrix based on the received plurality of transmit signal vectors; decompose the channel matrix to generate at least one alternate matrix; perform lattice reduction on the at least one alternate matrix to generate a transformed channel matrix comprising a reduced basis, the lattice reduction comprising: using a relaxed condition, searching a candidate set of Lenstra-Lenstra-Lovász (LLL) iterations with column swap operations in the at least one alternate matrix, wherein the relaxed condition provides for searching the candidate set of LLL iterations without performing size reduction operations on the at least one alternate matrix; using a relaxed criterion of decrease in LLL potential to select a first selection from the candidate set of LLL iterations; comparing the first selection to a predetermined termination condition; responsive to determining that the termination condition is not met, iteratively selecting a next selection from the candidate set of LLL iterations, each selection iteration comprising: performing a size reduction of the at least one alternate matrix to obtain at least one reduced matrix; performing a column swap on the at least one reduced matrix; using the relaxed condition, searching the at least one reduced matrix for a candidate set of LLL iterations with column swap operations; using the relaxed criterion of decrease in LLL potential, determining the next selection from the candidate set of LLL iterations; and comparing the next selection to the termination condition; responsive to determining that the termination condition is met, generating the reduced basis transformed channel matrix from the at least one alternate matrix; provide the reduced basis transformed channel matrix to a detector; and based on the reduced basis transformed channel matrix, detect particular transmit signal vectors for processing.

In some embodiments, the system further comprises wherein the transmitting antennas comprise transmitting antennas in a multiple-input, multiple-output system and the receiving antennas comprise receiving antennas in a multiple-input, multiple-output system.

In some embodiments, the system further comprises wherein the relaxed condition for searching the candidate set of iterations comprises $$\frac{|\tilde{R}_{k,k}|}{|\tilde{R}_{k-1,k-1}|} \geq \frac{1}{\sqrt{2}}, \quad \forall k \in [2, N_t].$$

In some embodiments, the system further comprises wherein the relaxed criterion of decrease in LLL potential comprises $$k = \operatorname{argmin}_{2 \leq k \leq N_t} \frac{|\tilde{R}_{k,k}|}{|\tilde{R}_{k-1,k-1}|}.$$

In some embodiments, the system further comprises wherein the predetermined termination condition comprises $n_k \geq 1/\sqrt{2}$. In some embodiments, the system further comprises wherein the predetermined termination condition further comprises an iteration count being less than a predefined maximum count.

In some embodiments, the system further comprises wherein the relaxed condition for searching the candidate set of iterations comprises $\sqrt{2}|\tilde{R}_{k,k}| \geq |\tilde{R}_{k-1,k-1}|$, $\forall k \in [2,N_t]$. In some embodiments, the system further comprises wherein the relaxed criterion of decrease in LLL potential comprises $$k = \begin{cases} \operatorname{argmin}_{flag(k)==1, 2 \leq k \leq N_t(k)} & \text{if Dual-}LR\text{-aided }LD \\ \operatorname{argmin}_{flag(k)==1, 2 \leq k \leq N_t(k)} & \text{if }LR\text{-aided }SIC/K\text{-best} \end{cases}$$

In some embodiments, the system further comprises wherein the predetermined termination condition comprises flag(k)= ($\sqrt{2}|\tilde{R}_{k,k}| < |\tilde{R}_{k-1,k-1}|$). In some embodiments, the system further comprises wherein the predetermined termination condition further comprises an iteration count being less than a predefined maximum count.

These and other objects, features and advantages of the present invention will become more apparent upon reading the following specification in conjunction with the accompanying drawing figures.

DETAIL DESCRIPTION OF THE INVENTION

Figure 1:
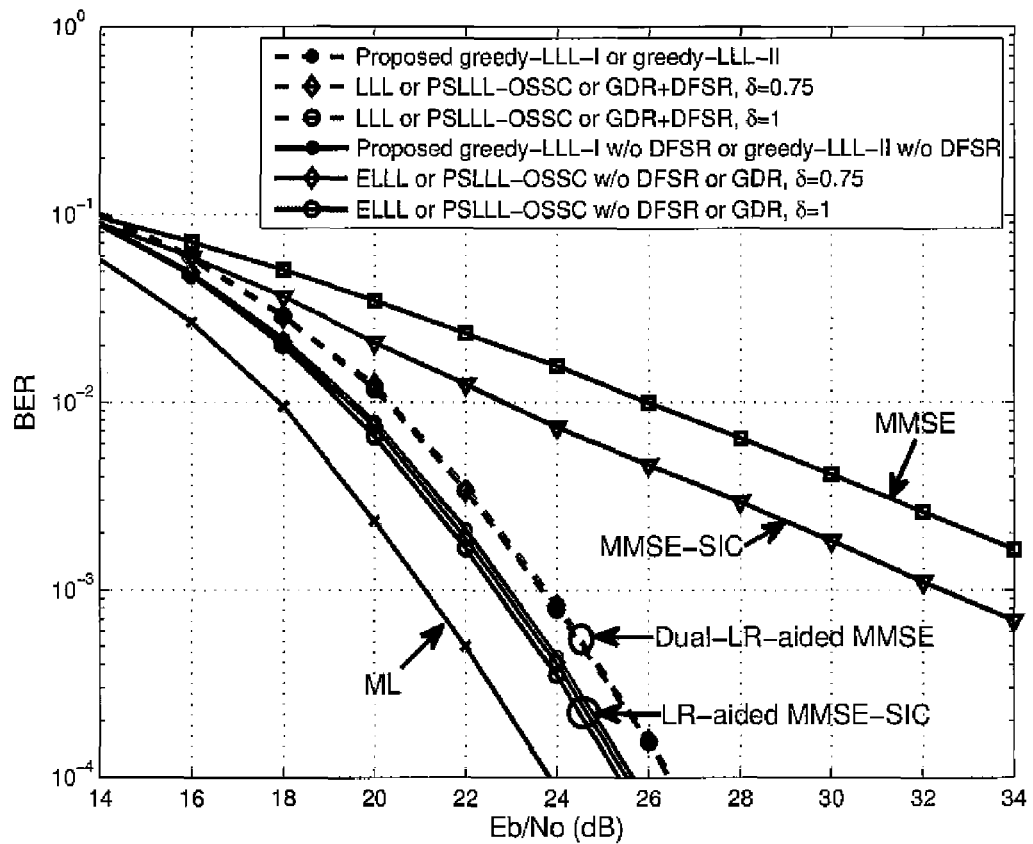
FIG. 1 depicts the uncoded BER performance of different LR algorithms in dual LR-aided MMSE-SIC and LR-aided MMSE-SIC detectors for a 4×4 MIMO system with 64-QAM.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

With regard to notations as used herein, boldface upper- and lower-case letters represent matrices and column vectors, respectively. $A_{i,k}$ denotes the (i, k)th entry of matrix A. $A_{a:b,c:d}$ indicates a submatrix of A including entries from rows a to b and from columns c to d. If only : is used, this corresponds to entries in a complete row or column. Index notation expressed as n=a:c indicates all the integer index numbers from a to C. $I_N$ denotes the N×N identity matrix and $0_{N\times 1}$ is the N×1 vector with all entries zero. The conjugate and Hermitian transpose are denoted by $(\cdot)^*$, $(\cdot)^H$, respectively. The real and imaginary parts of a complex number are represented as $\Re[\cdot]$ and $\Im[\cdot]$, and $j=\sqrt{-1}$. $\lfloor a \rfloor$ indicates rounding to the nearest integer of a.

In some instances, a computing device may be referred to as a mobile device, mobile computing device, a mobile station (MS), terminal, cellular phone, cellular handset, personal digital assistant (PDA), smart phone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

Various aspects described herein may be implemented using standard programming or engineering techniques to produce software, firmware, hardware, or any combination thereof to control a computing device to implement the disclosed subject matter. A computer-readable medium may include, for example: a magnetic storage device such as a hard disk, a floppy disk or a magnetic strip; an optical storage device such as a compact disk (CD) or digital versatile disk (DVD); a smart card; and a flash memory device such as a card, stick or key drive, or embedded component. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

Various systems, methods, and computer-readable mediums may be utilized for gamifying real-time network communications between users and will now be described with reference to the accompanying figures.

It will be understood by those of skill in the art that the present invention may incorporate various types computing device architectures. They may be embodied in a computing device (for example, a dedicated server computer or a mobile computing device). It will be understood that the computing device architecture is provided for example purposes only and does not limit the scope of the various embodiments of the present disclosed systems, methods, and computer-readable mediums.

The computing device architecture can include a CPU, where computer instructions are processed; a display interface that acts as a communication interface and provides functions for rendering video, graphics, images, and texts on the display. According to certain some embodiments of the disclosed technology, the display interface may be directly connected to a local display, such as a touch-screen display associated with a mobile computing device. In another example embodiment, the display interface may be configured for providing data, images, and other information for an external/remote display that is not necessarily physically connected to the mobile computing device. For example, a desktop monitor may be utilized for mirroring graphics and other information that is presented on a mobile computing device. According to certain some embodiments, the display interface may wirelessly communicate, for example, via a Wi-Fi channel or other available network connection interface to the external/remote display.

In an example embodiment, the network connection interface may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device architecture may include a keyboard interface that provides a communication interface to a keyboard. The computing device architecture may be configured to use an input device via one or more of input/output interfaces (for example, the keyboard interface, the display interface, the presence sensitive display interface, network connection interface, camera interface, sound interface, etc.) to allow a user to capture information into the computing device architecture. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture or may be a separate device. For example, the input device may be an accelerometer, a magnetometer, a digital camera, a microphone, and an optical sensor.

Example embodiments of the computing device architecture may include an antenna interface that provides a communication interface to an antenna; a network connection interface that provides a communication interface to a network. According to certain embodiments, a camera interface is provided that acts as a communication interface and provides functions for capturing digital images from a camera or other image/video capture device. According to certain embodiments, a sound interface is provided as a communication interface for converting sound into electrical signals using a microphone and for converting electrical signals into sound using a speaker. According to example embodiments, a random access memory (RAM) is provided, where computer instructions and data may be stored in a volatile memory device for processing by the CPU.

According to an example embodiment, the computing device architecture includes a read-only memory (ROM) where invariant low-level system code or data for basic system functions such as basic input and output (I/O), startup, or reception of keystrokes from a keyboard are stored in a non-volatile memory device. According to an example embodiment, the computing device architecture includes a storage medium or other suitable type of memory (e.g., RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system, application programs (including, for example, a web browser application, a widget or gadget engine, and or other applications, as necessary) and data files are stored. According to an example embodiment, the computing device architecture includes a power source that provides an appropriate alternating current (AC) or direct current (DC) to power components. According to an example embodiment, the computing device architecture includes a telephony subsystem that allows the device to transmit and receive sound over a telephone network. The constituent devices and the CPU communicate with each other over a bus.

According to an example embodiment, the CPU has appropriate structure to be a computer processor. In one arrangement, the CPU may include more than one processing unit. The RAM interfaces with the computer bus to provide quick RAM storage to the CPU during the execution of software programs such as the operating system application programs, and device drivers. More specifically, the CPU loads computer-executable process steps from the storage medium or other media into a field of the RAM in order to execute software programs. Data may be stored in the RAM, where the data may be accessed by the computer CPU during execution. In one example configuration, the device architecture includes at least 125 MB of RAM, and 256 MB of flash memory.

The storage medium itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium, which may comprise a machine-readable storage medium.

According to one example embodiment, the term computing device, as used herein, may be a CPU, or conceptualized as a CPU (for example, the CPU). In this example embodiment, the computing device may be coupled, connected, or in communication with one or more peripheral devices, such as display, camera, speaker, or microphone.

In some embodiments of the disclosed technology, the computing device may include any number of hardware or software applications that are executed to facilitate any of the operations. In some embodiments, one or more I/O interfaces may facilitate communication between the computing device and one or more input/output devices. For example, a universal serial bus port, a serial port, a disk drive, a CD-ROM drive, or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various embodiments of the disclosed technology and/or stored in one or more memory devices.

One or more network interfaces may facilitate connection of the computing device inputs and outputs to one or more suitable networks or connections; for example, the connections that facilitate communication with any number of sensors associated with the system. The one or more network interfaces may further facilitate connection to one or more suitable networks; for example, a local area network, a wide area network, the Internet, a cellular network, a radio-frequency network, a Bluetooth-enabled network, a Wi-Fi-enabled network, a satellite-based network, any wired network, any wireless network, etc., for communication with external devices or systems.

Embodiments of the present invention generally relate to the following system model $$y = Hs + w, \quad (1)$$

where y is an $N_r \times 1$ complex received signal vector, H is an $N_r \times N_t$ complex channel matrix, s is an $N_t \times 1$ complex transmitted signal vector drawn from the QAM constellation set, whose real and imaginary parts are $\{-\sqrt{M}+1, \ldots, -1, 1, \ldots, \sqrt{M}-1\}$ with $M$ being the constellation size, and w is the additive white Gaussian noise vector with zero mean and covariance matrix as $\sigma_w^2 I_{N_r}$. We assume that H is known at the receiving side but unknown at the transmitting side.

A primary goal of the invention is to design greedy LLL algorithms with further improved convergence and decreased complexity while keeping similar error performance in LR-aided detectors compared to the existing greedy LLL algorithms.

Greedy LLL Algorithm-I

Two designs are proposed to implement the greedy LLL algorithm-I according to embodiments of the present invention.

First, a relaxed Lovász condition for searching the candidate set of LLL iterations with column swap operations is proposed as $$\frac{|\tilde{R}_{k,k}|}{|\tilde{R}_{k-1,k-1}|} \geq \frac{1}{\sqrt{2}}, \quad \forall k \in [2, N_t]. \quad (2)$$

Since this relaxed Lovász condition does not involve the off-diagonal elements in $\tilde{R}$, its evaluation does not need size reduction operations so that it can save complexity compared to the existing greedy LLL algorithms.

Second, a relaxed criterion of the decrease in LLL potential to select the optimal one in the candidate set of LLL iterations is proposed as $$k = \operatorname{argmin}_{2 \leq k \leq N_t} \frac{|\tilde{R}_{k,k}|}{|\tilde{R}_{k-1,k-1}|}, \quad (3)$$

which also exhibits lower complexity than that of the existing greedy LLL algorithms. Besides, its main calculation part is the same as the aforementioned relaxed Lovász condition in (2), which can be denoted as $$\eta_k = \frac{|\tilde{R}_{k,k}|}{|\tilde{R}_{k-1,k-1}|}, \quad 2 \leq k \leq N_t. \quad (4)$$

Since $\eta_k$ depends on the diagonal elements of $\tilde{R}$ and the LLL iteration at index k affects the diagonal elements $\tilde{R}_{k,k}$, and $\tilde{R}_{k-1,k-1}$, we only need to update $\eta_{k-1}$ (if k>2), $\eta_k$, and $\eta_{k+1}$ (if k<$N_t$) after the first LLL iteration instead of calculating all $\eta_k$ each time.

Based on the aforementioned two relaxations, the proposed greedy LLL algorithm-I is summarized in Table II. In the table, lines 2-5 are the initial evaluation of the proposed selection method of LLL iterations and lines 10-13 correspond to the updates of $\eta_k$ and the next selection of LLL iteration. Line 7 is the condition to determine whether the algorithm is terminated or not. In line 7, besides the relaxed Lovász condition, the early termination is also adopted to set a predefined maximum iteration number as $N_{max}$ ($N_{max}=\infty$ if there is no early termination). Note that for size reduction in Table II, we adopt the effective size reduction (line 8) as in ELLL plus the delayed full size reduction (DFSR, lines 16-18) as in PLLL-OSSC. And in the LR-aided SIC/K-best detectors, the DF SR part can be dropped without affecting the error performance.

TABLE II

PROPOSED GREEDY LLL ALGORITHM-I

Input: Q, R, P (after QR/SQRD/MMSE-SQRD)
Output: $\tilde{Q}$, $\tilde{R}$, T
1:   Initialize: $\tilde{Q} = Q$, $\tilde{R} = R$, T = P, $N_{max}$
2:   for i = 2 : $N_t$
3:      $\eta_i = |\tilde{R}_{i,i}|/|\tilde{R}_{i-1,i-1}|$
4:   end
5:   k = arg $\min_{2 \leq i \leq N_t} \eta_i$
6:   $\eta_{iter} = 0$
7:   while ($\eta_k < 1/\sqrt{2}$) && ($\eta_{iter} < N_{max}$)
8:      Execute effective size reduction (lines 4-10 of Table I)
9:      Execute column swap (lines 12-15 of Table I)
10:     for i = {k, k ± 1} ∩ [2, $N_t$]
11:        $\eta_i = |\tilde{R}_{i,i}|/|\tilde{R}_{i-1,i-1}|$
12:     end
13:     k = arg $\min_{2 \leq i \leq N_t} \eta_i$
14:     $\eta_{iter} = \eta_{iter} + 1$
15:  end
16:  †for k = 2 : $N_t$
17:     Execute size reduction (lines 4-10 of Table I)
18:  end †Lines 16-18 can be dropped for LR-aided SIC/K-best detectors.

Greedy LLL Algorithm-II

Two designs are proposed to implement the greedy LLL algorithm-II according to embodiments of the present invention.

First, a relaxed Lovász condition for searching the candidate set of LLL iterations with column swap operations is proposed as $$\sqrt{2}|\tilde{R}_{k,k}| \geq |\tilde{R}_{k-1,k-1}|, \forall k \in [2,N_t] \quad (5)$$

Compared with the relaxed Lovász condition in (2) of the greedy LLL algorithm-I, the relaxed Lovász condition in (5) exhibits an equivalent form with less complexity since it does not need the division operation.

Second, the criterion to select the optimal one in the candidate set of LLL iterations is proposed based on the detection type as $$k = \begin{cases} \operatorname{argmin}_{flag(k)==1, 2 \leq k \leq N_t(k)} & \text{if Dual-}LR\text{-aided }LD \\ \operatorname{argmin}_{flag(k)==1, 2 \leq k \leq N_t(k)} & \text{if }LR\text{-aided }SIC/K\text{-best} \end{cases} \quad (6)$$

where flag(k)=($\sqrt{2}|\tilde{R}_{k,k}|<|\tilde{R}_{k-1,k-1}|$) indicate whether the relaxed Lovasz condition is satisfied or not. Equation (6) means that the selection of the optimal LLL candidate each time is either the maximum value or minimum value of the column index k in the candidate set of LLL iterations.

Based on the aforementioned discussion, we summarize the proposed greedy LLL algorithm-II in Table III. In this table, the main computational parts, i.e., the effective size reduction, the column swap, and the DFSR, are the same as the greedy LLL algorithm-I in Table II. Here, the relaxed Lovász condition (lines 2-4) is expressed in an equivalent form as (2) but without division operation, so it is more suitable for high speed hardware implementation. Another difference compared to the greedy LLL algorithm-I is the selection method of LLL iterations (line 7) which is optimized corresponding to the error performance of specific LR-aided detectors.

TABLE III

PROPOSED GREEDY LLL ALGORITHM-II

Input: Q, R, P (after QR/SQRD/MMSE-SQRD)
Output: $\tilde{Q}$, $\tilde{R}$, T
1:   Initialize: $\tilde{Q} = Q$, $\tilde{R} = R$, T = P, flag = zeros (1, $N_t$), $N_{max}$
2:   for i = 2: $N_t$
3:      flag(i) = ($\sqrt{2}|R_{i,i}| < |R_{i-1,i-1}|$)
4:   end
5:   $\eta_{iter} = 0$
6:   while (sum(flag) ≠ 0) && $\eta_{(iter} < N_{max})$
7:      $k = \begin{cases} \arg\min_{flag(i)==1, 2\leq i \leq N_t}(i) & \text{if Dual-LR-aided SIC/K-best} \\ \arg\max_{flag(i)==1, 2\leq i \leq N_t}(i) & \text{if LR-aided SIC/K-best} \end{cases}$
8:      Execute effective size reduction (lines 4-10 of Table I)
9:      Execute column swap lines 12-15 of Table 1)
10:     for i = {k, k ± 1}∩[2, $N_t$]
11:        flag(i) = (2|$R_{i,i}$| < |$R_{i-1,i-1}$|)
12:     end
13:     $n_{iter} = n_{iter} + 1$
14:  end
15:  †Exceute delayed full size redaction (lines 16-18 of Table II)

Line 15 can be dropped for LR-aided SIC/K-best detectors.

FIG. 1 depicts the uncoded BER performance of different LR algorithms in dual-LR-aided MMSE-SIC and LR-aided MMSE-SIC detectors for a 4×4 MIMO system with 64-QAM. To make fair comparison, we use the LRs with full size reduction in the dual-LR-aided MMSE detector, i.e., LLL, PSLLL-OSSC, GDR+DFSR (adding DFSR in the end of GDR), and the proposed greedy LLL algorithm-I/II; while we adopt the LRs with only effective size reduction in the LR-aided MMSE-SIC detector, i.e., ELLL, PSLLL-OSSC without DFSR, GDR, and the proposed greedy LLL algorithm-I/II without DFSR. It can be seen that all the LR algorithms have almost the same BER performance in either the dual-LR-aided MMSE-SIC detector or the LR-aided MMSE-SIC detector, which indicates that the proposed two greedy LLL algorithms exhibit almost no performance loss compared with the LLL/PSLLL-OSSC/GDR algorithm.

Figure 2:
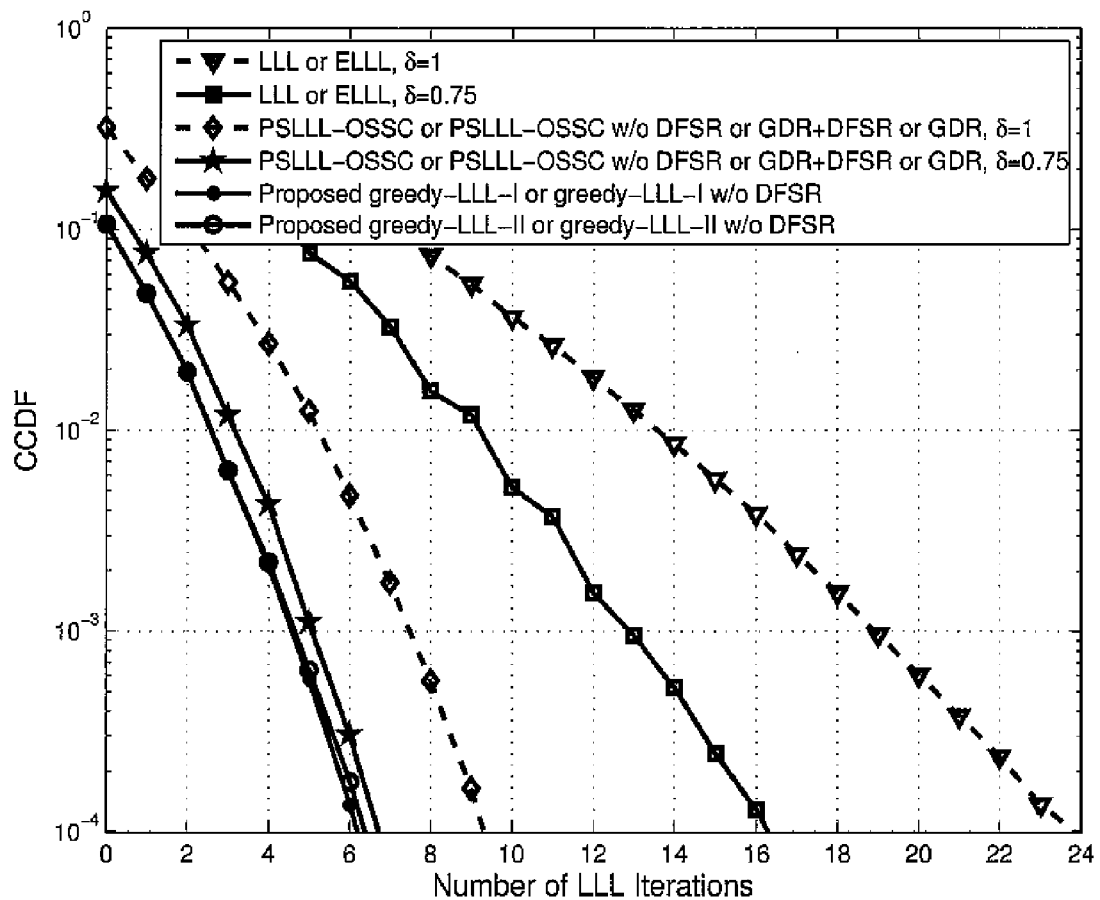
FIG. 2 illustrates the convergence of different LRs by the complementary cumulative distribution function (CCDF) of the number of LLL iterations.

FIG. 2 illustrates the convergence of different LRs by the complementary cumulative distribution function (CCDF) of the number of LLL iterations. One LLL iteration is defined as one-time execution of (effective) size reduction, (relaxed) Lovász condition evaluation, and (possible) column swap in the LLL algorithm or its variants. First, the LRs with δ=1 need more LLL iterations than those with δ=0.75 in LLL, PSLLL-OSSC, and GDR algorithms. Second, the PSLLL-OSSC/GDR converges much faster than LLL due to the greedy characteristic. Finally, the proposed greedy LLL algorithm-I/II can further improve the convergence compared to PSLLL-OSSC/GDR algorithms.

Figure 3:
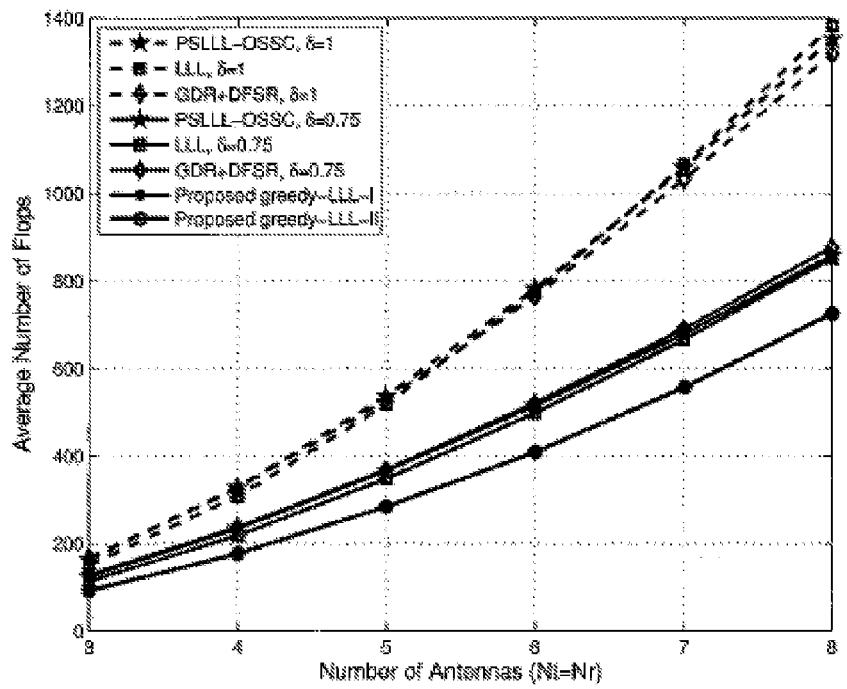
FIG. 3 depicts the complexity of different LRs from 3×3 to 8×8 MIMO systems by average equivalent real floating-point operations (flops).
Figure 3:
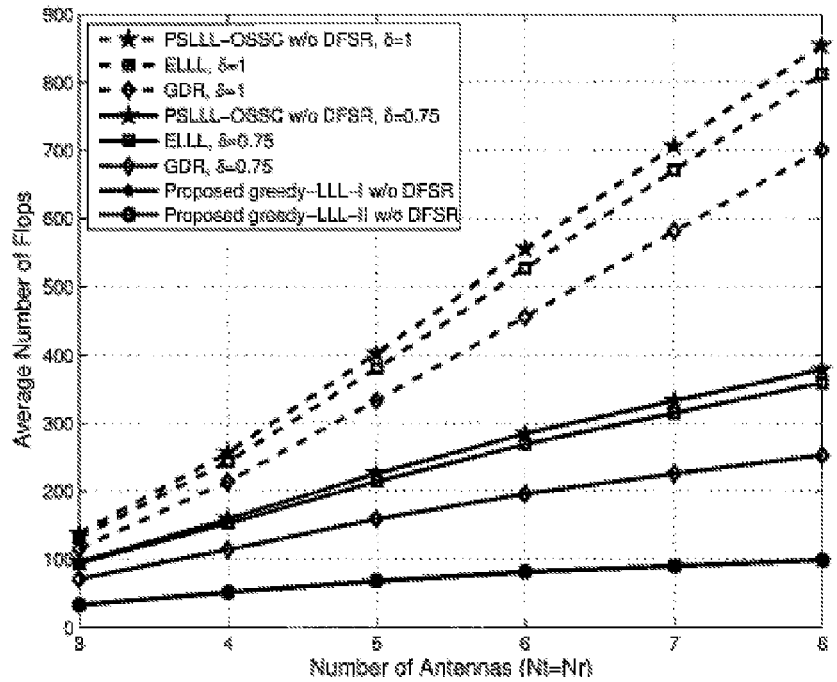

FIG. 3 depicts the complexity of different LRs from 3 ×3 to 8 ×8 MIMO systems by average equivalent real floating-point operations (flops). First, for each LR scheme of LLL, PSLLL-OSSC, and GDR, the version with δ=1 exhibits higher complexity than the version with δ=0.75. Second, the PSLLL-OSSC has a little higher complexity than the GDR and LLL algorithms. Finally, the proposed greedy LLL algorithms achieves the lowest complexity in both dual-LR-aided MMSE-SIC and LR-aided MMSE-SIC detectors.

Figure 4:
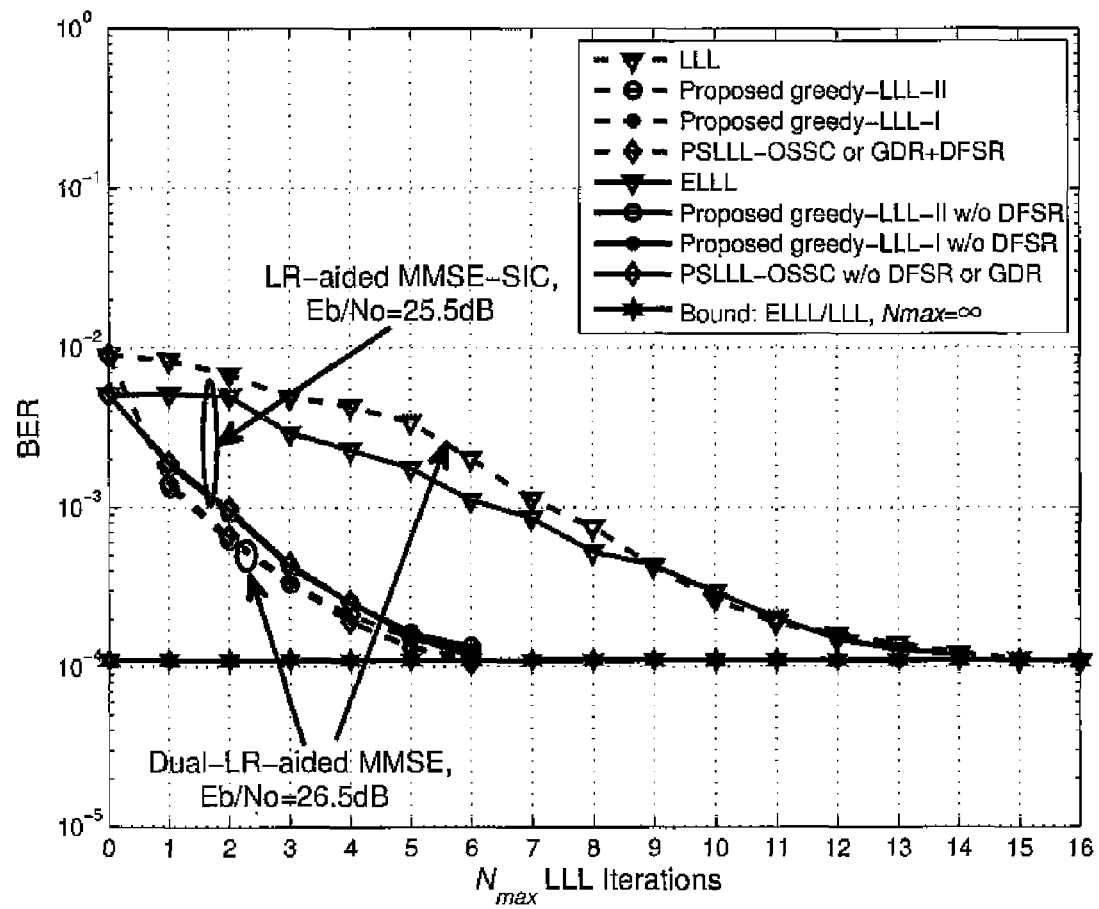
FIG. 4 depicts the results of BER of different LR algorithms with early termination.
Figure 5:
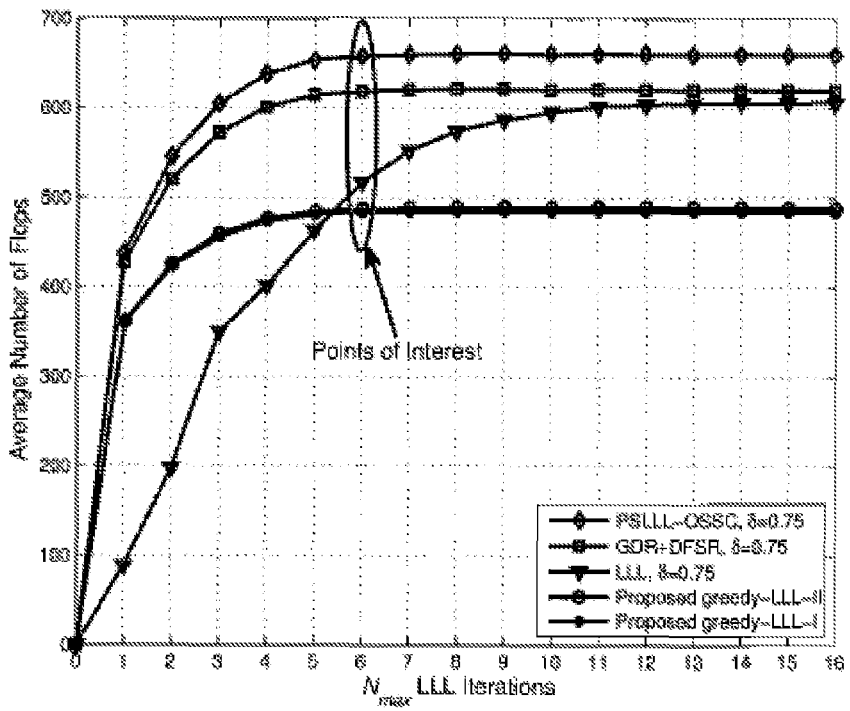
FIG. 5 depicts the results of complexity of different LR algorithms with early termination.
Figure 5:
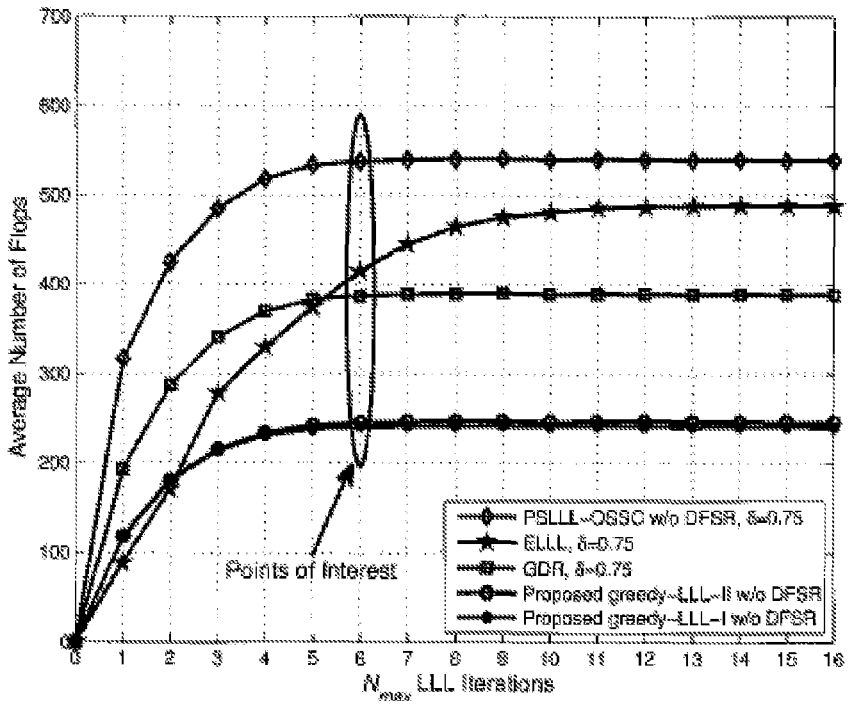

FIG. 4 and FIG. 5 depict the results of BER and complexity of different LR algorithms with early termination, i.e., $N_{max} \neq \infty$, which is usually the case in practical hardware.

First, FIG. 4 demonstrates the convergence of different LR algorithms in terms of BER versus maximum number of LLL iteration $N_{max}$, where the Eb/No is selected such that the BER of the LLL with $N_{max} = \infty$, (without early termination) can achieve around $10^{-4}$. It can be seen that the LLL algorithm exhibits much slower convergence than all greedy LLL algorithms in all cases while the proposed two greedy LLL algorithms have almost the same convergence as the PSLLL-OSSC/GDR in both dual-LR-aided MMSE detector and the LR-aided MMSE-SIC detector. All the greedy LLLs need only $N_{max} = 6$ LLL iterations to approach the best performance.

Second, FIG. 5 shows the complexity of different LR algorithms in terms of average number of flops versus $N_{max}$, where the values of Eb/No are selected the same as those in the FIG. 4. It can be seen that the complexity of each LR remains stable after some $N_{max}$ LLL iterations. Based on the final stable complexities, the proposed two greedy LLL algorithms enable the smallest complexity. When only considering the $N_{max} = 6$, the proposed two greedy LLL algorithms still have the lowest complexity while maintaining the best error performance as shown in FIG. 4.

Figure 6:
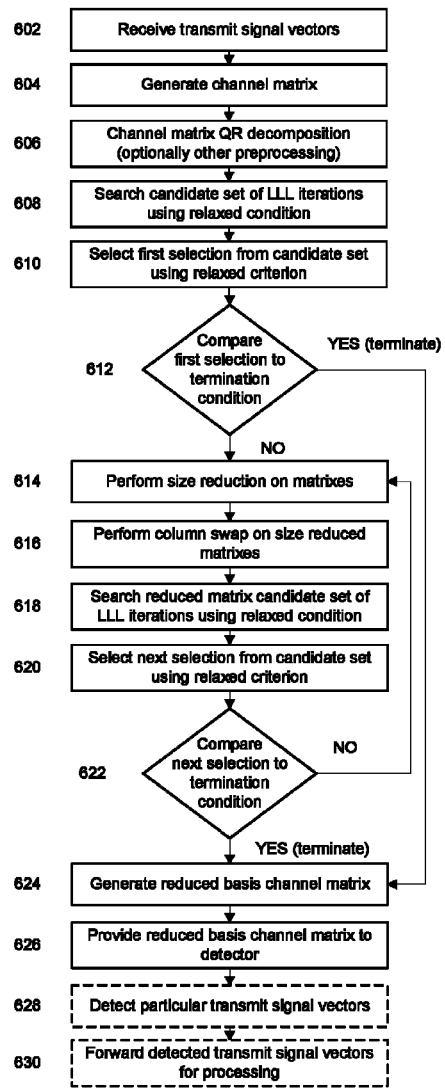
FIG. 6 provides a flowchart of exemplary operations according to an example embodiment of the present invention.

FIG. 6 provides a flowchart of exemplary operations for lattice reduction according to an example embodiment of the present invention. At block 602, a plurality of receiving antennas of a transmission system (for example, a MIMO system) each receive a plurality of transmit signal vectors with each transmit signal vector originating from one of a plurality of transmitting antenna. For example, the plurality of transmit signal vectors from a transmitting antenna may be due to multipath effects.

At block 604, a channel matrix is generated based on the plurality of transmit signal vectors received by the receiving antennas (e.g., the complex received signal vectors). At block 606, decomposition is applied to the channel matrix to generate at least one alternate matrix. For example, QR decomposition may be used to generate Q and R matrices from the complex channel matrix H.

Lattice reduction to generate a transformed channel matrix comprising a reduced basis is then performed. At block 608, a relaxed Lovász condition is used to search a candidate set of Lenstra-Lenstra-Lovász (LLL) iterations with column swap operations using the R̃matrix. This evaluation using the relaxed Lovász condition does not need size reduction operations, reducing complexity compared to other greedy LLL algorithms (size reduction is only used inside the next LLL iteration after the searching stage). At block 610, a relaxed criterion of decrease in LLL potential is used in selecting a first selection from the candidate set of LLL iterations with column swap operations.

At block 612, the first selection from the candidate set of LLL iterations is compared to a predetermined termination condition to determine whether the greedy LLL algorithm should be terminated or not. Embodiments may also provide for a pre-defined maximum number of LLL iterations that may be undertaken before the greedy LLL algorithm is terminated. If, at block 612, it is determined that the greedy LLL algorithm should not be terminated (the termination condition is not met, 612-NO), an iterative process of selecting the next LLL iteration from the candidate set is started. If, at block 612, it is determined that the greedy LLL algorithm should be terminated (the termination condition is met, 612-YES), operations continue to block 624.

At block 614, size reduction is performed on the alternate matrixes. At block 616, column swapping is performed on the reduced alternate matrixes (for example, k−1 and k may be swapped in the R̃ and T matrixes). At block 618, the relaxed Lovász condition is used to search a candidate set of Lenstra-Lenstra-Lovász (LLL) iterations with column swap operations using the alternate matrix modified at blocks 614 and 616. At block 620, the relaxed criterion of decrease in LLL potential to determine (select) the next selection from the candidate set of LLL iterations. At block 622, the next selection from the candidate set of LLL iterations is compared to the predetermined termination condition to determine whether the greedy LLL algorithm should be terminated or not. If, at block 622, it is determined that the greedy LLL algorithm should not be terminated (the termination condition is not met, 622-NO), the iterative process of selecting the next LLL iteration from the candidate set is continued by returning to block 614. If, at block 622, it is determined that the greedy LLL algorithm should be terminated (the termination condition is met, 622-YES), the lattice reduction is complete and operations continue to block 624. At block 624, the reduced basis channel matrix is generated based on the alternate matrixes.

At block 626, the reduced basis channel matrix may be provided to a detector (for example, an LR-aided detectors such as LR-aided SIC and K-best detectors). At block 628, the LR-aided detector may detect particular transmitted signal vectors from each transmitting antenna. At block 630, the detected transmitted signal vectors may be forwarded for further processes in the transmission system.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:
1. A method comprising:
receiving, at each one of a plurality of receiving sources, a plurality of transmit signal vectors, each of the plurality of transmit signal vectors originating from one of a plurality of transmitting sources;
generating a channel matrix based on the received plurality of transmit signal vectors;
decomposing the channel matrix to generate at least one alternate matrix;
performing lattice reduction on the at least one alternate matrix to generate a transformed channel matrix comprising a reduced basis, the lattice reduction comprising:
using a relaxed condition, searching a candidate set of Lenstra-Lenstra-Lovász (LLL) iterations with column swap operations in the at least one alternate matrix, wherein the relaxed condition provides for searching the candidate set of LLL iterations without performing size reduction operations on the at least one alternate matrix;

using a relaxed criterion of decrease in LLL potential, wherein the relaxed criterion of decrease in LLL potential comprises $$k = \mathrm{argmin}_{2 \leq k \leq N_t} \frac{|\tilde{R}_{k,k}|}{|\tilde{R}_{k-1,k-1}|},$$

selecting a first selection from the candidate set of LLL iterations, wherein $|\tilde{R}_{k,k}|$ indicates the absolute value of $$\tilde{R}_{k,k}, \text{ and } \mathrm{argmin}_{2 \leq k \leq N_t} \frac{|\tilde{R}_{k,k}|}{|\tilde{R}_{k-1,k-1}|}$$

indicates finding the k value in the range of 2,3, . . . , $N_t$ that corresponds to a minimum value in $$\frac{|\tilde{R}_{k,k}|}{|\tilde{R}_{k-1,k-1}|};$$

comparing the first selection to a predetermined termination condition;
responsive to determining that the termination condition is not met, iteratively selecting a next selection from the candidate set of LLL iterations, each selection iteration comprising:
performing a size reduction of the at least one alternate matrix to obtain at least one reduced matrix;
performing a column swap on the at least one reduced matrix;
using the relaxed condition, searching the at least one reduced matrix for a candidate set of LLL iterations with column swap operations;
using the relaxed criterion of decrease in LLL potential, determining the next selection from the candidate set of LLL iterations; and
comparing the next selection to the termination condition;
responsive to determining that the termination condition is met, generating the reduced basis transformed channel matrix from the at least one alternate matrix;
providing the reduced basis transformed channel matrix to a detector; and
based on the reduced basis transformed channel matrix, detecting particular transmit signal vectors for processing.

2. The method of claim 1, wherein the transmitting sources comprise transmitting antennas in a multiple-input, multiple-output system and the receiving sources comprise receiving antennas in a multiple-input, multiple-output system.

3. The method of claim 1, wherein the relaxed condition for searching the candidate set of iterations comprises $$\frac{|\tilde{R}_{k,k}|}{|\tilde{R}_{k-1,k-1}|} \geq \frac{1}{\sqrt{2}}, \quad \forall k \in [2, N_t],$$

wherein $\forall k \in [2, N_t]$ indicates each k value in the range of 2,3, . . . $N_t$.

4. The method of claim 1, wherein the predetermined termination condition comprises $\eta_k \geq 1/\sqrt{2}$, wherein $\eta_k$ is defined as $$\eta_k = \frac{|\tilde{R}_{k,k}|}{|\tilde{R}_{k-1,k-1}|},$$

$\forall k \in [2, N_t]$.

5. The method of claim 4, wherein the predetermined termination condition further comprises an iteration count being less than a predefined maximum count.

6. The method of claim 1, wherein the relaxed condition for searching the candidate set of iterations comprises $\sqrt{2}|\tilde{R}_{k,k}| \geq |\tilde{R}_{k-1,k-1}|$, $\forall k \in [2, N_t]$, wherein the value of $(\sqrt{2}|\tilde{R}_{k,k}| < |\tilde{R}_{k-1,k-1}|)$ is 1 if $\sqrt{2}|\tilde{R}_{k,k}|$ is less than $|\tilde{R}_{k-1,k-1}|$, otherwise, the value of $(\sqrt{2}|\tilde{R}_{k,k}| < |\tilde{R}_{k-1,k-1}|)$ is 0.

7. A method comprising:
receiving, at each one of a plurality of receiving sources, a plurality of transmit signal vectors, each of the plurality of transmit signal vectors originating from one of a plurality of transmitting sources;
generating a channel matrix based on the received plurality of transmit signal vectors;
decomposing the channel matrix to generate at least one alternate matrix;
performing lattice reduction on the at least one alternate matrix to generate a transformed channel matrix comprising a reduced basis, the lattice reduction comprising:
using a relaxed condition, searching a candidate set of Lenstra-Lenstra-Lovász (LLL) iterations with column swap operations in the at least one alternate matrix, wherein the relaxed condition provides for searching the candidate set of LLL iterations without performing size reduction operations on the at least one alternate matrix;
using a relaxed criterion of decrease in LLL potential, wherein the relaxed criterion of decrease in LLL potential comprises $$k = \begin{cases} \mathrm{argmin}_{flag(k)==1, 2 \leq k \leq N_t}(k), & \text{if Dual-}LR\text{-aided } LD \\ \mathrm{argmax}_{flag(k)==1, 2 \leq k \leq N_t}(k), & \text{if } LR\text{-aided } SIC/K\text{-best} \end{cases},$$

wherein $\arg\min_{flag(k)==1, 2 \leq k \leq N_t}(k)$ indicates finding a minimum k value, which is in the range of 2,3, . . ., $N_t$ and meanwhile the corresponding value of flag(k) is 1, and $\arg\max_{flag(k)==1, 2 \leq k \leq N_t}(k)$ indicates finding a maximum k value, which of 2,3, . . . , $N_t$ and meanwhile the corresponding value of flag(k) is 1;
wherein LR is lattice reduction, LD is linear detector, and SIC is successive interference cancelation, selecting a first selection from the candidate set of LLL iterations;
comparing the first selection to a predetermined termination condition;
responsive to determining that the termination condition is not met, iteratively selecting a next selection from the candidate set of LLL iterations, each selection iteration comprising:

performing a size reduction of the at least one alternate matrix to obtain at least one reduced matrix;

performing a column swap on the at least one reduced matrix;

using the relaxed condition, searching the at least one reduced matrix for a candidate set of LLL iterations with column swap operations;

using the relaxed criterion of decrease in LLL potential, determining the next selection from the candidate set of LLL iterations; and comparing the next selection to the termination condition;

responsive to determining that the termination condition is met, generating the reduced basis transformed channel matrix from the at least one alternate matrix;

providing the reduced basis transformed channel matrix to a detector; and based on the reduced basis transformed channel matrix, detecting particular transmit signal vectors for processing.

8. The method of claim 7, wherein the predetermined termination condition comprises flag(k)=($\sqrt{2}|\tilde{R}_{k,k}|<|\tilde{R}_{k-1,k-1}|$), wherein the value of ($\sqrt{2}|\tilde{R}_{k,k}|<|\tilde{R}_{k-1,k-1}|$) is 1 if $\sqrt{2}|\tilde{R}_{k,k}|$ is less than $|\tilde{R}_{k-1,k-1}|$, otherwise, the value of ($\sqrt{2}|\tilde{R}_{k,k}|<|\tilde{R}_{k-1,k-1}|$) is 0.

9. The method of claim 8, wherein the predetermined termination condition further comprises an iteration count being less than a predefined maximum count.

10. A transmission system comprising:
a plurality of transmitting antennas $N_t$;
a plurality of receiving antennas $N_r$;
wherein a received signal vector $y=[y_1, y_2, \ldots, y_{N_r}]^T$ is expressed as y=Hs+w, where H is an $N_r \times N_t (N_r \geq N_t)$ channel matrix, $s=[s_1, s_2, \ldots, s_{N_t}]^T$, $(s_i \in S)$ is a transit signal vector drawn from a quadrature amplitude modulation (QAM) constellation set S with $E[ss^H]=\sigma_s^2 I_{N_t}$, whose real and imaginary parts are $-\sqrt{M}+1, \ldots, -1, 1, \ldots, \sqrt{M}-1$ with M being the constellation size of S, and $w=[w_1, w_2, \ldots, w_{N_r}]^T$ is the additive white Gaussian noise vector with zero mean and covariance matrix as $\sigma_w^2 I_{N_r}$; and an apparatus comprising:
at least one processor; and
at least one memory comprising computer program instructions, the computer program instructions When executed by the at least one processor, causing the apparatus to:
receive, at each one of the plurality of receiving antennas, a. plurality of transmit signal vectors, each of the plurality of transmit signal vectors originating from one of the plurality of transmitting antennas;
generate a channel matrix based on the received plurality of transmit signal vectors;
decompose the channel matrix to generate at least one alternate matrix;
perform lattice reduction on the at least one alternate matrix to generate a transformed channel matrix comprising a reduced basis, the lattice reduction comprising:
using a relaxed condition, searching a candidate set of Lenstra-Lenstra-Lovász (LLL) iterations with column swap operations in the at least one alternate matrix, wherein the relaxed condition provides for searching the candidate set of LLL iterations without performing size reduction operations on the at least one alternate matrix;

using a relaxed criterion of decrease in LLL potential to select a first selection from the candidate set of LLL iterations, wherein the relaxed criterion of decrease in LLL potential comprises $$k = \text{argmin}_{2 \leq k \leq N_t} \frac{|\tilde{R}_{k,k}|}{|\tilde{R}_{k-1,k-1}|},$$

wherein $|\tilde{R}_{k,k}|$ indicates the absolute value of $$\tilde{R}_{k,k}, \text{ and argmin}_{2 \leq k \leq N_t} \frac{|\tilde{R}_{k,k}|}{|\tilde{R}_{k-1,k-1}|}$$

indicates finding the k value in the range of $2, 3, \ldots N_t$ that corresponds to a minimum value in $$\frac{|\tilde{R}_{k,k}|}{|\tilde{R}_{k-1,k-1}|};$$

comparing the first selection to a predetermined termination condition;

responsive to determining that the termination condition is not met, iteratively selecting a next selection from the candidate set of LLL iterations, each selection iteration comprising:
performing a size reduction of the at least one alternate matrix to obtain at least one reduced matrix;
performing a column swap on the at least one reduced matrix;
using the relaxed condition, searching the at least one reduced matrix for a candidate set of LLL iterations with column swap operations;
using the relaxed criterion of decrease in LLL potential, determining the next selection from the candidate set of LLL iterations; and
comparing the next selection to the termination condition;

responsive to determining that the termination condition is met, generating the reduced basis transformed channel matrix from the at least one alternate matrix;
provide the reduced basis transformed channel matrix to a detector;
based on the reduced basis transformed channel matrix, detect particular transmit signal vectors for processing.

11. The system of claim 10, wherein the transmitting antennas comprise transmitting antennas in a multiple-input, multiple-output system and the receiving antennas comprise receiving antennas in a multiple-input, multiple-output system.

12. The system of claim 10, wherein the relaxed condition for searching the candidate set of iterations comprises $$\frac{|\tilde{R}_{k,k}|}{|\tilde{R}_{k-1,k-1}|} \geq \frac{1}{\sqrt{2}}, \forall k \in [2, N_t],$$

wherein $\forall k \in [2, N_t]$ indicates each k value in the range of $2, 3, \ldots N_t$.

13. The system of claim 10, wherein the predetermined termination condition comprises $\eta_k \geq 1/\sqrt{2} \eta_k \geq 1/\sqrt{2}$, wherein $\eta_k$ is defined as $$\eta_k = \frac{|\tilde{R}_{k,k}|}{|\tilde{R}_{k-1,k-1}|},$$

$\forall k \in [2,N_t]$.

14. The system of claim 13, wherein the predetermined termination condition further comprises an iteration count being less than a predefined maximum count.

15. The system of claim 10, wherein the relaxed condition for searching the candidate set of iterations comprises $\sqrt{2}|\tilde{R}_{k,k}| \geq |\tilde{R}_{k-1,k-1}|$, $\forall k \in [2,N_t]$, wherein the value of $(\sqrt{2}|\tilde{R}_{k,k}| < |\tilde{R}_{k-1,k-1}|)$ is 1 if $\sqrt{2}|\tilde{R}_{k,k}|$ is less than $|\tilde{R}_{k-1,k-1}|$, otherwise, the value of $(\sqrt{2}|\tilde{R}_{k,k}| < |\tilde{R}_{k-1,k-1}|)$ is 0.

16. A transmission system comprising:
a plurality of transmitting antennas $N_t$,
a plurality of receiving antennas $N_r$;
wherein a received signal vector $y=[y_1, y_2, \ldots, y_{N_r}]^T$ is expressed as $y=Hs+w$, where H is an $N_r \times N_t$ ($N_r \geq N_t$) channel matrix, $s=[s_1, s_2, \ldots, s_{N_t}]^T$, ($s_t \in S$) is a transmit signal vector drawn from a quadrature amplitude modulation (QAM) constellation set S with $E[ss^H]=\sigma_s^2 I_{N_t}$ whose real and imaginary parts are $-\sqrt{M}+1, \ldots, -1, 1, \ldots, \sqrt{M}-1$ with M being the constellation size of S, and $w=[w_1, w_2, \ldots, w_{N_r}]^T$ is the additive white Gaussian noise vector with zero mean and covariance matrix as $\sigma_w^2 I_{N_r}$; and
an apparatus comprising:
at least one processor; and
at least one memory comprising computer program instructions, the computer program instructions When executed by the at least one processor, causing the apparatus to:
receive, at each one of the plurality of receiving antennas, a plurality of transmit signal vectors, each of the plurality of transmit signal vectors originating from one of the plurality of transmitting antennas;
generate a channel matrix based on the received plurality of transmit signal vectors;
decompose the channel matrix to generate at least one alternate matrix;
perform lattice reduction on the at least one alternate matrix to generate a transformed channel matrix comprising a reduced basis, the lattice reduction comprising:
using a relaxed condition, searching a candidate set of Lenstra-Lenstra-Lovász (LLL) iterations with column swap operations in the at least one alternate matrix, wherein the relaxed condition provides for searching the candidate set of LLL iterations without performing size reduction operations on the at least one alternate matrix;
using a relaxed criterion of decrease in LLL potential to select a first selection from the candidate set of iterations, wherein the relaxed criterion of decrease in LLL potential comprises $$k = \begin{cases} \mathrm{argmin}_{flag(k)==1, 2 \leq k \leq N_t(k)}, & \text{if Dual-}LR\text{-aided }LD \\ \mathrm{argmin}_{flag(k)==1, 2 \leq k \leq N_t(k)}, & \text{if }LR\text{-aided }SIC/K\text{-best} \end{cases},$$

wherein $\arg \min_{flag(k)==1, 2 \leq k \leq N_t}(k)$ indicates finding a minimum k value, which is in the range of $2, 3, \ldots, N_t$ and meanwhile the corresponding value of flag (k) is 1, and $\arg \max_{flag(k)==1, 2 \leq k \leq N_t}(k)$ indicates finding a maximum k value, which is in the range of $2, 3, \ldots, N_t$, and meanwhile the corresponding value of flag(k) is 1;
wherein LR is lattice reduction, LD is linear detector, and SIC is successive interference cancelation;
comparing the first selection to a predetermined termination condition;
responsive to determining that the termination condition is not met, iteratively selecting a next selection from the candidate set of LLL iterations, each selection iteration comprising:
performing a size reduction of the at least one alternate matrix to obtain at least one reduced matrix;
performing a column swap on the at least one reduced matrix;
using the relaxed condition, searching the at least one reduced matrix for a candidate set of LLL iterations with column swap operations;
using the relaxed criterion of decrease in LLL potential, determining the next selection from the candidate set of LLL iterations; and
comparing the next selection to the termination condition;
responsive to determining that the termination condition is met, generating the reduced basis transformed channel matrix from the at least one alternate matrix;
provide the reduced basis transformed channel matrix to a detector; and
based on the reduced basis transformed channel matrix, detect particular transmit signal vectors for processing.

17. The system of claim 16, wherein the predetermined termination condition comprises flag $(k)=(\sqrt{2}|\tilde{R}_{k,k}| < |\tilde{R}_{k-1,k-1}|)$, wherein the value of $(\sqrt{2}|\tilde{R}_{k,k}| < |\tilde{R}_{k-1,k-1}|)$ is 1 if $\sqrt{2}|\tilde{R}_{k,k}|$ is less than $|\tilde{R}_{k-1,k-1}|$, otherwise, the value of $(\sqrt{2}|\tilde{R}_{k,k}| < |\tilde{R}_{k-1,k-1}|)$ is 0.

18. The system of claim 17, wherein the predetermined termination condition further comprises an iteration count being less than a predefined maximum count.

* * * * *